INVENTOR.
MAURICE J. LEVEQUE

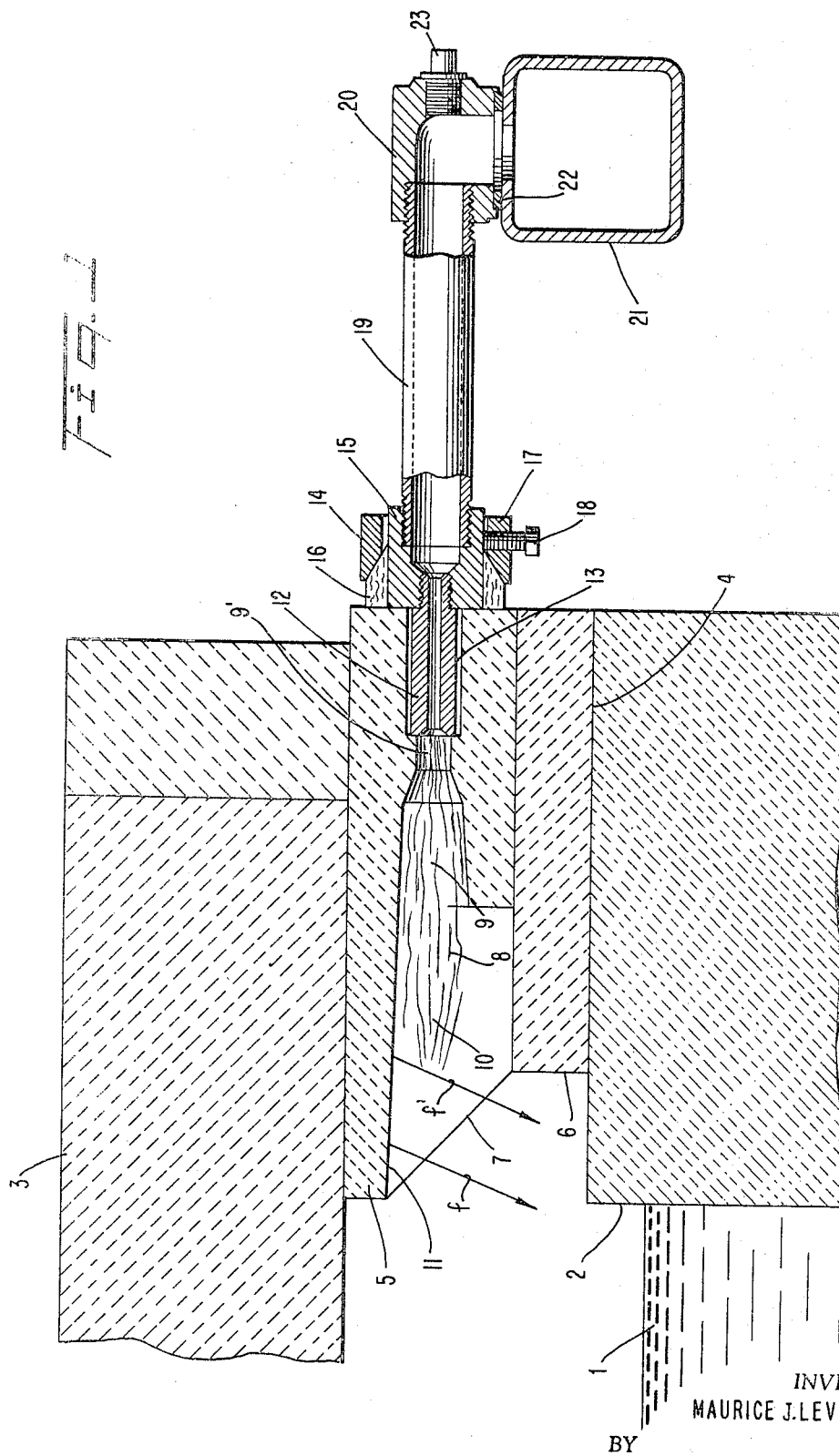

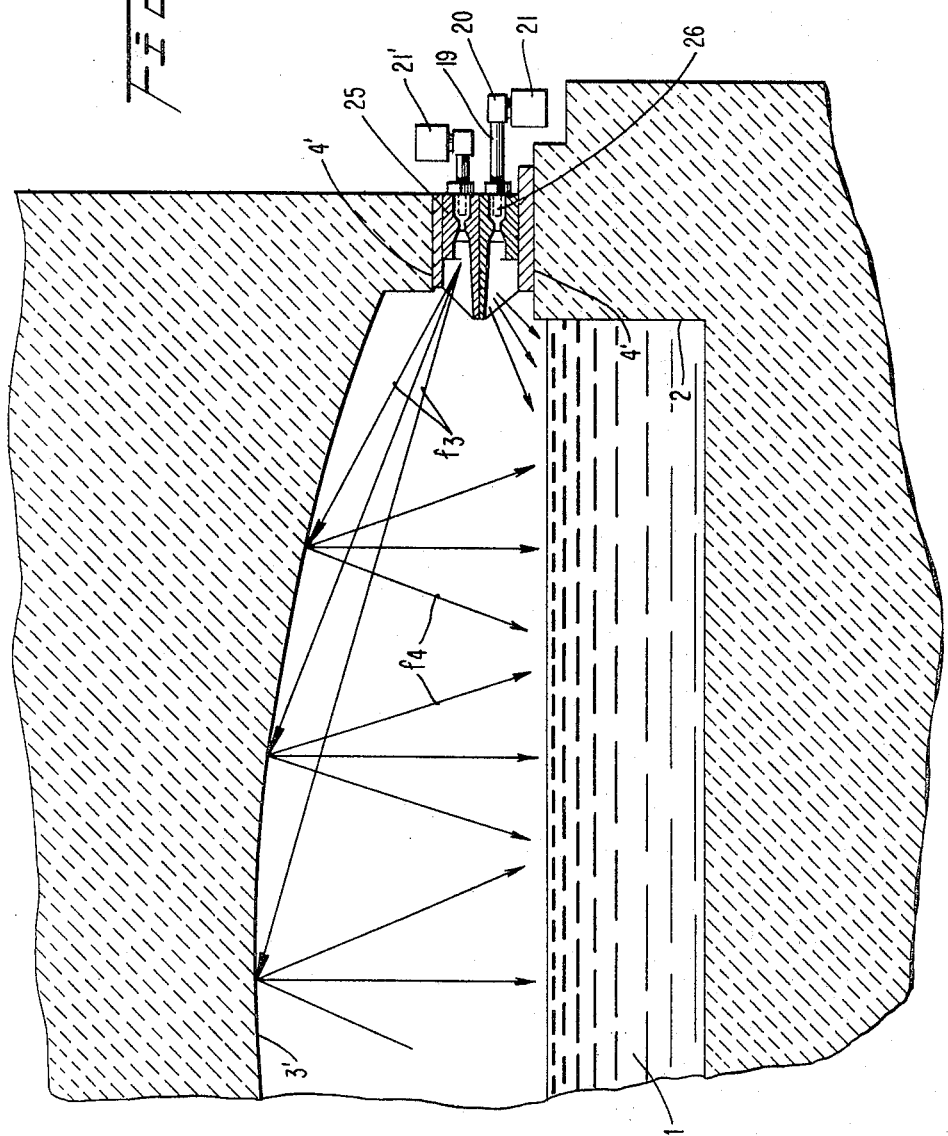

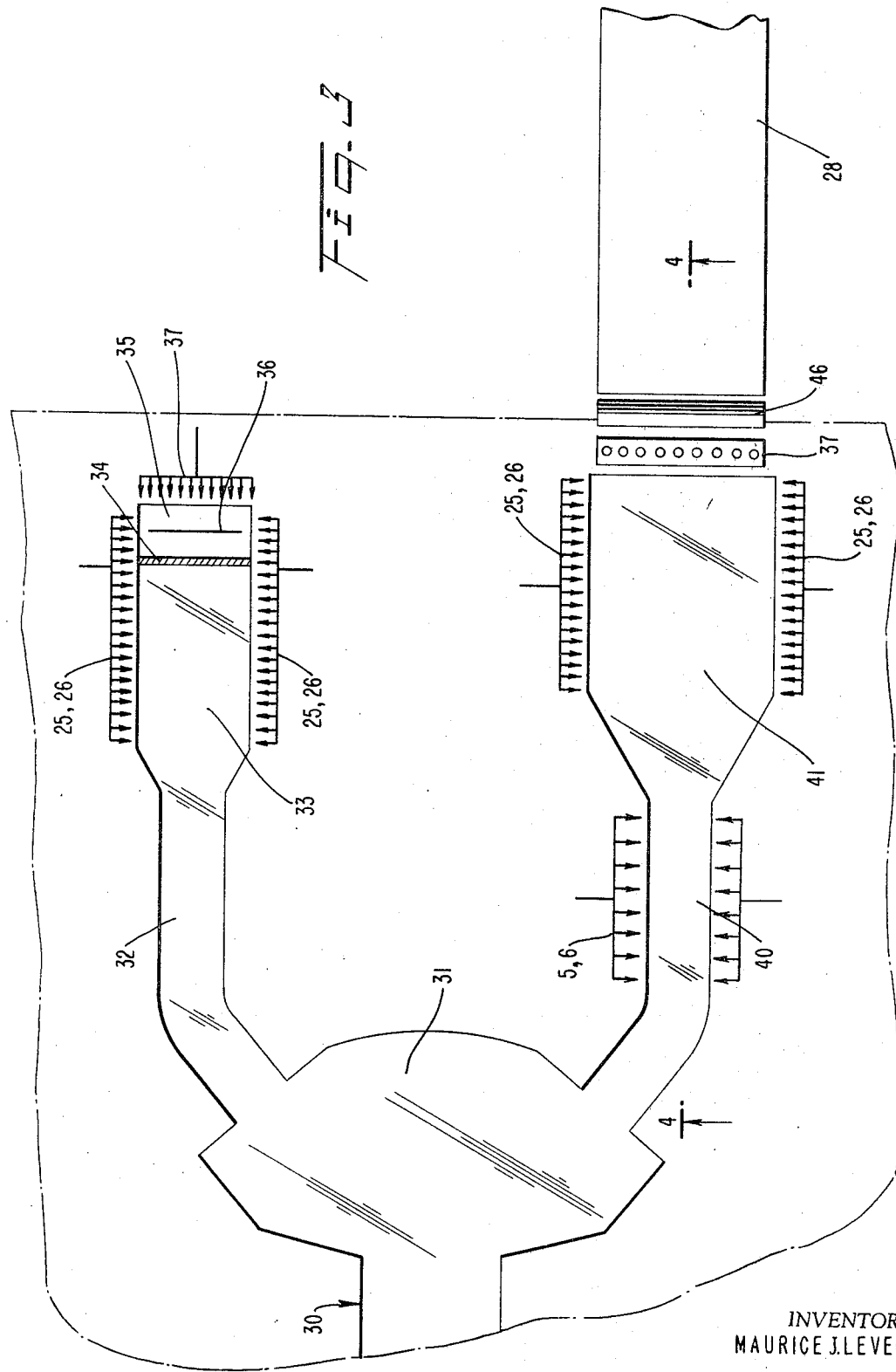

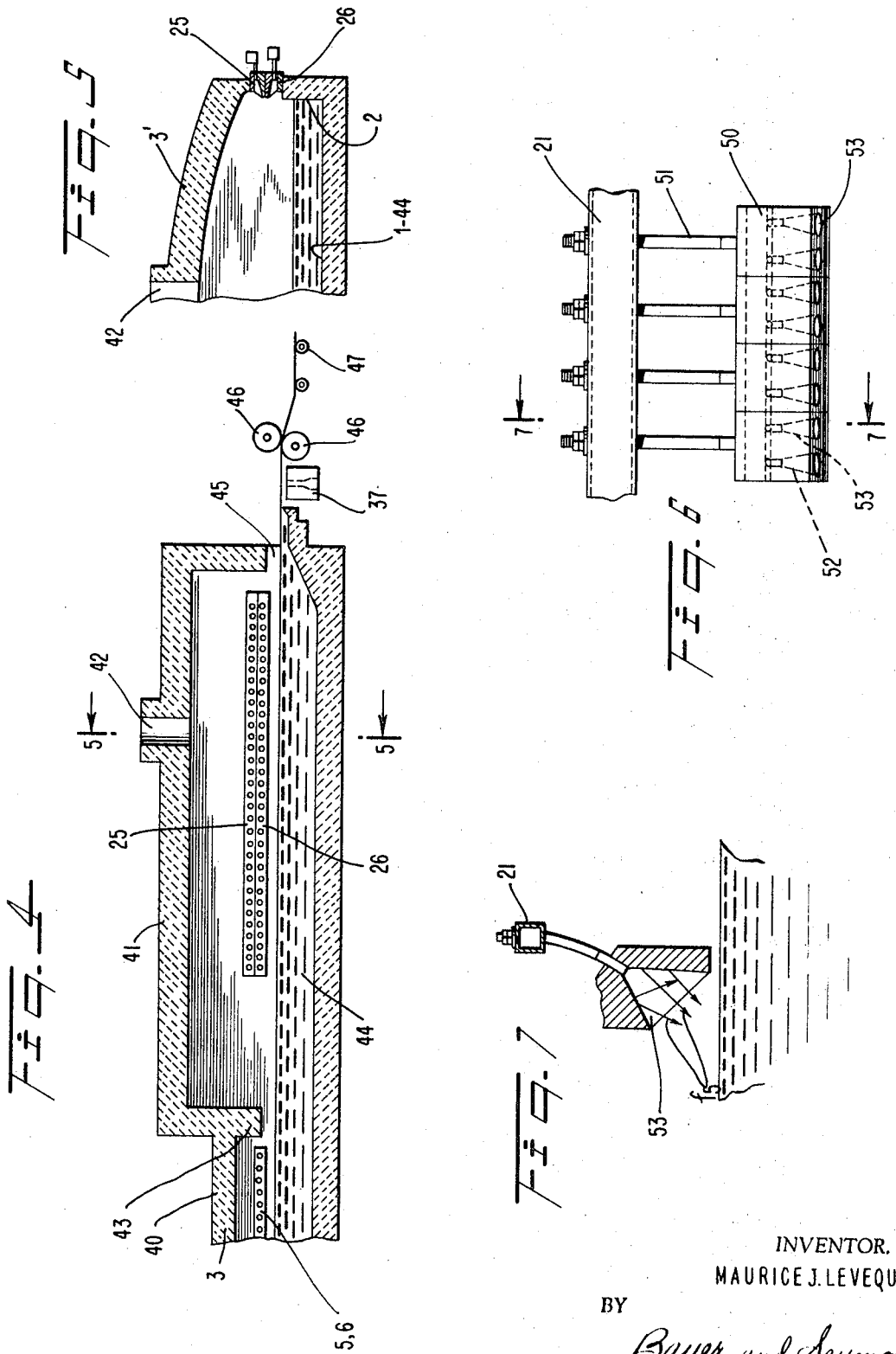

United States Patent Office 3,523,781
Patented Aug. 11, 1970

3,523,781
METHOD AND APPARATUS FOR HEATING GLASS MELTING FOREHEARTHS
Maurice J. Leveque, Issy-les-Moulineaux, France, assignor to Compagnie de Saint-Gobain, Neuilly-sur-Seine, France
Filed Mar. 17, 1967, Ser. No. 624,098
Claims priority, application France, Mar. 22, 1966, 54,563
Int. Cl. C03b 5/16
U.S. Cl. 65—134      7 Claims

ABSTRACT OF THE DISCLOSURE

Widthwise temperature uniformity of the glass within the canal of a vaulted forehearth results from directing radiant energy generated by combustion simultaneously from an upper row of burners and from a lower row of burners, each upper burner having a lower wall part longer than its upper wall part and each lower burner having an upper wall part longer than its lower wall part. The upper row of burners direct radiant energy upon the vault by which it is radiated onto the entire width of the glass in the canal, while the lower row of burners simultaneously direct radiant energy onto areas of the glass adjacent to the canal walls only.

---

This invention relates to the delivery of molten glass from the furnace in which it is made to the apparatus which is to shape it. Molten glass is delivered from the furnace in which it is made to the forming machine by canals which are of small cross section compared to the furnace. The glass is supposed to be delivered by the canal to the forming machinery at a uniformly certain temperature. The methods of heating have been so irregular in effect, and radiation of heat from the canal has been so irregular and so difficult to control, that approximate uniformity of temperature has not been attained at the point of delivery, temperature differences across the width of the sheet on the order of 25° C. and more being common. It is an object of this invention to correct such imperfections and to institute delivery of glass from the canals of forehearths and the like with improved uniformity of temperature.

Glass is melted and fined in melting furnaces and delivered in molten state to machines which shape it as flat glass, molded blocks, hollow bodies, etc. and it is desirable to supply several machines from one furnace. When this is done the molten glass flows to each machine along its own feeder canal, which must be thermally conditioned to keep the glass at even temperature and homogeneous texture so that maximum efficiency can be achieved with each forming machine. It has been excessively difficult to keep the temperature substantially the same throughout the transverse section of the canal, especially at the delivery end and near the walls, because of the ratio of radiating surface, provided by the walls, to the section and mass of glass in the canal. It is also important that the control of the temperature along the canal be such that the glass undergoes cooling as it approaches the shaping machine to be delivered at the correct temperature. Except when the glass is to be used at furnace temperature, which is unusual, it is necessary to provide a delivery canal even when the furnace has to supply only a single forming machine. The problem increases in difficulty with the number and kinds of forming machines served by the furnace.

In early prior practice involving canals and a temperature of delivery different from that existing in the furnace, control was possible within commercially acceptable limits, but the rate of withdrawal of the glass from the furnace, both in the manufacture of hollow ware and flat glass, has now become so high, and the number of machines served by a single furnace has so increased, that the feeder canals have become longer and wider, preventing the establishment of uniform temperature across the section of the glass in the canal. The problem exists in all cases where a large canal is designed to provide glass for flat glass such as molded, poured, or drawn sheets. Furthermore, for that type of product it is necessary that the molten glass arrive at the machine in a state of thermal equality throughout its cross section, a desideratum which is made extremely difficult by the width of the sheet and the high rate of radiation by the walls adjacent its edges. The problem is yet more difficult when it concerns colored glass because it is advantageous to enlarge its width and reduce its depth in the canal for a given rate of discharge.

It is an object of the invention to deliver molten glass from the furnace which makes it to the machines which shape it with a uniformity of temperature which was previously unattainable, particularly in canals of substantial width such as those which deliver the glass to sheet forming machines. Another object is to heat vaulted chambers of reflective and radiant types by combustion in a manner which compensates for that irregularity in the application and the escape of heat which was characteristic of the prior art. A particular object is, in glass furnaces, to deliver the molten glass to forming machinery at a selected and uniform temperature. This object is particularly important in the manufacture of sheet glass wherein the temperature formerly varied widely from one portion of the glass to another as delivered to the forming machines, resulting in the uniform treatment of glass in different molecular states, with resulting imperfection. Another object is to construct novel forehearths and the like to accomplish the method. Another object is to provide radiant combustion heaters of novel design. It is another object to make forehearths of new and superior efficiency. As the invention is of substantial importance in the manufacture of flat glass, it will be described in that connection.

The objects of the invention are accomplished, generally speaking, by a method of heating glass in the canal of vaulted forehearths, feeders and the like which comprises directing heat generated by combustion upon the vault from whence it is radiated upon the width of the glass in the canal, and directing heat generated by combustion upon the glass in regions limited to those portions of the glass adjacent the canal walls; and by vaulted forehearths, feeders and the like having a canal beneath the vault, for flowing glass, and a double row of directional heating means above the glass level along each side of the canal, one row on each side being directed toward the vault and one row being directed upon a limited region of glass adjacent to the wall of the canal. Novel radiant combustion heating means are also within the purview of the invention.

The forehearths of this invention are vaulted, have side walls which extend above the level of the glass, and each of the side walls has two rows of directional heaters, one row directing its heat on the ribbon of the stream of glass which is adjacent to the wall and the other row directing its flow of heat upon the vault. The heat projected upon the vault is radiated by the vault upon the whole width of the glass in the canal. The heat from the other row of heating means is directed upon the glass adjacent the walls. The combination of two heating means establishes a uniformity of temperature throughout the cross section of the glass which is far superior to what has heretofore been attained. For example a forehearth which previously exhibited an unbalance of 25° was found after installation of the new system to have a maximum unbalance of 10° and a minimum of only one to several degrees. The glass drawn and rolled from this canal, after the installation of the heating system of the present invention, was notably superior in its optical properties to that which had previously been made from the same composition, the same canal, and the same drawing machine.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical sectional view through a burner of novel type installed in the side wall of a forehearth with a flat vault;

FIG. 2 is a vertical cross section through a preferred form of the invention, about half the width of a feeder canal, with an arched vault, being shown;

FIG. 3 is a diagrammatical plan view of a glass furnace with two delivery canals, one supplying glass to a pool for the vertical drawing of glass sheet and the other supplying glass to horizontal rollers for forming glass sheet;

FIG. 4 is a vertical section on the line 4—4 of FIG. 3, with details added;

FIG. 5 is a vertical cross section on the line 5—5 of FIG. 4;

FIG. 6 is an elevational view of a novel burner arrangement for auxiliary heat treatment of the glass sheet;

FIG. 7 is a section on line 7—7 of FIG. 6;

Figure 8:
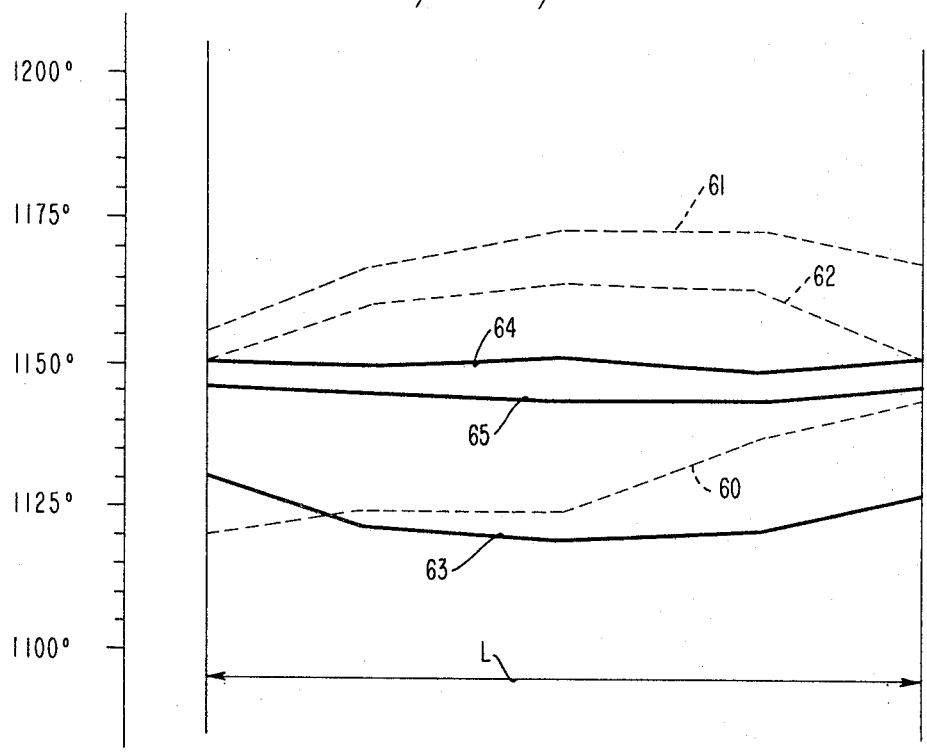
Figure 9:
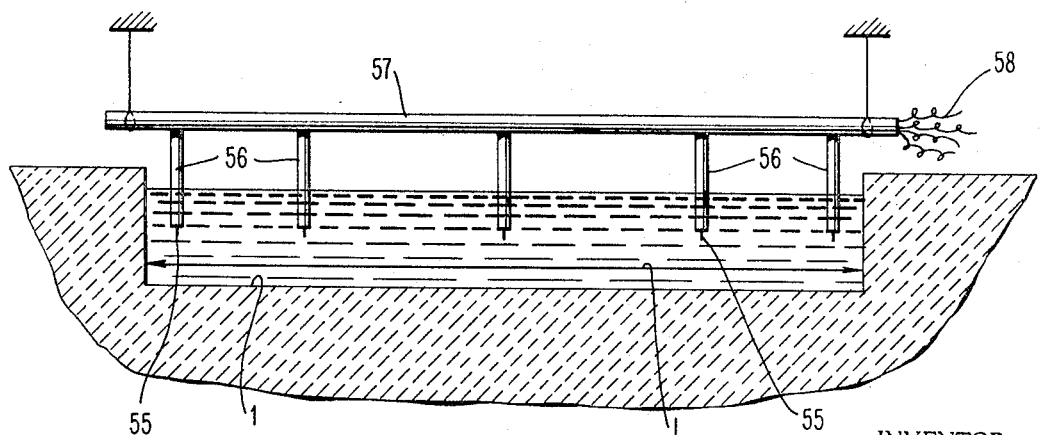

FIG. 8 shows comparative temperature curves, taken at various depths, in a forehearth of the type illustrated in FIGS. 3 and 9, in which the temperatures existing at particular depths, prior to the installation of the new heating system, are compared with like temperatures at like depths after the adoption of the present invention; and FIG. 9 is a diagrammatic sectional view of the type of apparatus by which the curves of FIG. 8 were obtained.

In FIG. 1 a canal 1 containing molten glass is provided with refractory side walls 2 and a flat vault 3, apertures 4 being provided for the radiant burners which are to be employed in the invention. The combustion chamber and radiation means for the burner are comprised of two blocks 5, 6, of which the latter is shorter than the former, providing an angularly directed port 7. A burner provides a high intensity, short flame 8 which is received in a combustion chamber 9 formed in block 5. The chamber has a throat 9' of smaller dimensions and opens into a radiation chamber 10 of larger dimensions, the walls of which absorb the heat of combustion and radiate it as shown by the arrows $f$, $f'$. The direction of radiation is controlled by the angle of the the upper surface 11 of the radiation chamber, which will be prepared in advance according to its requisite service. The blocks 5 and 6 are made of refractory material of good radiant properties, for example sillimanite.

The heat from the combustion means is absorbed by the sillimanite blocks and radiate in the direction of the arrows, part of it, in the construction shown, being directed upon the portions of the glass adjacent and parallel to the wall 2, and some of it being directed upon the portions of the wall adjacent to the glass.

The burner itself is comprised of a nozzle 12 which is received in an aperture 13 in the block 5. The nozzle is screwed into a metal support 15 which abuts the wall about aperture 13; it is sealed against the escape of gas by an asbestos ring 16 which is held in place by a metal lock ring 17 controlled by a screw 18. A metal tube 19 is screwed into the metal support 15 and carries at its outer end a metal pipe joint 20 to which is attached a gas chamber 21 by a tight seal 22. A tight screw 23 gives access for the cleaning of the burner. The gas chambers 21 can be individual and supplied with an air-fuel mixture by individual valves or they may be a single, elongated type such as shown in FIG. 6. While the construction of the canal and the radiant combustion heater are regarded as novel the burner construction per se is regarded as typical.

In FIG. 2 is shown the preferred form of the invention, illustrating one side of a vaulted feeder designed for the delivery of glass to sheet forming machines. The canal 1 has an arcuate vault 3' and side walls 2. Apertures 4' receive an upper row of radiant combustion heating means 25 and a lower row 26. The radiant heat from the upper row is directed upward as shown by arrows $f^3$ against the crown which, becoming incandescent, radiates heat downward upon substantially the full width of the glass as indicated by arrows $f^4$. The lower row of radiant combustion heaters projects its heat upon a region of glass which is near the side walls 2 of the canal. The construction of the upper and lower radiant combustion heating means is identical, in this instance, the one being directed upwardly against the vault and the other downwardly to a limited area near the wall. In each case the burners give a short flame of high temperature which raises the wall of the combustion and radiation chambers to high temperatures and that wall radiates its heat with directional effect.

FIG. 3 illustrates in diagrammatic plan view the delivery and 31 of a glass furnace 30 having a delivery canal 32 which is broader at its end 33 wherein the motlen glass becomes wider and cooler. The rows of burners are arranged as in FIG. 2 and are indicated by numbers 25, 26. Near the end of the canal is a weir 34 over which glass flows into a drawing compartment 35 in which appropriate drawing means including a drawing bar 36 draws glass sheet vertically in accordance with known principles which do not form a part of this invention. At the base of the drawn sheet a row of auxiliary burners 37 of construction to be hereinafter described furnishes auxiliary heat for the perfection of the product.

A canal 40 having an enlarged delivery section 41 is likewise provided with the rows of heating means illustrated in FIGS. 2 and 4. An aperture 42 is provided in the dome for the escape of gases. The narrow portion of canal 40 is provided with a double row of heating means 5, 6 according to FIG. 1, serving to prevent serious unbalance in the temperature at the edge and center of the canal during that portion of the flow of glass. A hanging wall 43 approaches the top of the glass flow and thermally separates the two portions of the canal from each other. The glass 44 passes to the discharge orifice 45 and to shaping rollers 46 which form the sheet in accordance with known principles, the sheet being then received upon appropriate supporting means, in this instance rollers 47 being indicated.

FIG. 5 is the complement of FIG. 4 to which like numbers apply. In FIGS. 4 and 5 the narrow portion of the canal is illustrated with a flat vault as in FIG. 1 and the portion 41 is illustrated as having the domed vault as in FIG. 2. This combination is effective and novel.

In FIG. 3 the glass as its leaves the furnace through orifice 45 passes between auxiliary burners 37 placed above and below the sheet for the purpose of maintaining the selected optimum rolling temperature. The burners can be used with different intensity to compensate for the different conditions on the top and bottom of the sheet. After formation, the sheet is delivered to supporting means 28 of standard type, for instance flotation on molten tin.

The intensity of the burners is individually adjustable along the rows so that compensation can be made for conditions existing in particular locations.

It will be observed that the burners in the two rows have been placed close together both vertically and horizontally. It may be helpful to supply the glass bath as it pours out of the canal an addition of heat which can be regulated according to the different parts of the bath, and for this purpose there is disposed transversely to the bath a row of auxiliary or radiant combustion burners as indicated at 37 and in FIGS. 6 and 7 at 53. An elongated gas chamber 21 supports and is connected to burner heads 50 by pipes 51. The burner heads 50 are illustrated as containing two burners 52, 53 of flared internal construction and massive body. The sides of the burner heads are flat and engaged with one another, a construction which is equally adaptable to the forms of radiant combustion heating means indicated at 25, 26, FIGS. 2 and 3. In this way rows of any selected length can be built up without difficulty. Means for controlling the intensity of each burner has not been illustrated but may be presumed to be of standard type. The flame heats the massive walls of the refractory and these project their radiation as illustrated by the arrows $f^5$. The burners are close together so that there is no gap in their effectiveness. They apply their heat to a narrow band of the moving glass. The width and length of the band will be controlled by the shape given to the radiant chamber.

FIG. 9 illustrates an apparatus for determining the temperature of the glass at various levels in the canal 1. As illustrated, this includes thermocouples 55 on the ends of tubes 56 which are supported by a hollow bar 57 from the end of which the leads 58 emerge for connection to appropriate instruments equipped with dials indicating temperatures. By moving the bar 57 up and down, readings can be taken at different depths in the glass. Using this apparatus readings were taken at depths of 20 mm., 40 mm., and 60 mm. in a standard canal before and after the installation of the apparatus of this invention.

FIG. 8 shows the temperature curves at these depths before the installation of the apparatus of the invention and afterward; curves 60, 61, and 62 show the temperature gradient across the glass at depths of 20, 40 and 60 mm. respectively without benefit of the present invention. Curves 63, 64, and 65 show the temperature gradient in the same location at the same depths of 20, 40 and 60 mm. after the installation of the apparatus of the invention and the adoption of the novel process. It will be observed by studying the curves that not only is the temperature more even across the width of the sheet, but that the temperatures have been brought closer to ideal drawing temperature, and that the difference in temperature at different depths in the flowing glass has been reduced.

These advantages are substantial and result in glass sheet of more uniform surface and improved optical properties.

As many apparently widely different embodiments of the present invention may be made without departing from the spirit and scope thereof, it is to be understood that the invention is not limited to the specific embodiments.

What is claimed is:

1. A method of heating glass in the canal of vaulted forehearths and feeders which comprises directing radiant energy generated by combustion, simultaneously from an upper row of burners and from a lower row of burners, each upper burner having a lower wall part longer than its upper wall part and each lower burner having an upper wall part longer than its lower wall part, the upper row of burners directing radiant energy upon the vault, by which it is radiated onto the entire width of the glass in the canal, the lower row of burners directing radiant energy generated by combustion, onto areas of the glass surface adjacent to the canal walls only.

2. A method according to claim 1 in which the longer lower wall part of each burner in the upper row directs radiant energy onto the vault, and the longer upper wall part of each burner of the lower row directs radiant energy onto the areas of the glass extending along and adjacent to the side walls of the canal.

3. Vaulted forehearths and feeders, having a canal beneath the vault, for flowing glass, and upper and lower rows of burners disposed along each side wall of the canal, above the glass level, each burner of said upper row having a lower wall part longer than its upper wall part, and each burner of said lower row having an upper wall part longer than its lower wall part, whereby said upper row of burners directs radiant energy by combustion onto the vault of the canal, by which it is radiated onto the glass in the canal across the entire width thereof, and simultaneously said lower row of burners directs radiant energy onto a limited area of glass adjacent to the side walls of the canal.

4. The apparatus of claim 3, further comprising a drawing basing fed by said canal, means to draw sheet glass upwardly from said basin, and auxiliary heating means directed upon and along the base of the sheet being drawn from said basin.

5. The apparatus of claim 3, further comprising sheet forming means horizontally aligned with and contiguous to the delivery end of said canal, and auxiliary heating means directed upon the width of the glass sheet being formed, between said canal and said forming means.

6. The apparatus of claim 3, wherein said canal has means at its terminal end for delivery of molten glass in a sheet and further comprising a row of directional radiant heaters aligned to extend transversely across the canal at its said terminal end, near the level of the sheet of glass emerging therefrom, said row of heaters directing radiant energy upon said sheet, over a narrow, transversely extending area thereof.

7. Apparatus for heating glass in the canal of vaulted forehearths and feeders comprising simultaneously operable upper and lower horizontally-disposed, vertically-spaced contiguous rows of burners arranged along each side wall of the canal above the level of glass therein, each burner of said lower row having an upper wall part longer than its lower wall part to thereby direct radiant energy onto the glass in a relatively narrow band extending along and in contact with each side wall of the canal, each burner of said upper row having a lower wall part longer than its upper wall part to thereby direct radiant energy onto the lower surface area of the vault of said canal, from which radiant energy is directed onto the surface area of the glass in said canal over substantially the entire width thereof.

References Cited

UNITED STATES PATENTS

| | | | |
|---|---|---|---|
| 1,893,061 | 1/1933 | Peiler | 65—337 |
| 2,139,911 | 12/1938 | Peiler | 65—137 |
| 2,144,973 | 1/1939 | Honiss | 65—137 |
| 2,337,605 | 12/1943 | Hogenson | 65—347 |
| 3,233,995 | 2/1966 | Javaux | 65—99 |
| 3,312,454 | 4/1967 | Keough | 263—15 |

S. LEON BASHORE, Primary Examiner

E. R. FREEDMAN, Assistant Examiner

U.S. Cl. X.R.

65—135, 136, 337, 356; 263—15